US012132366B2

(12) United States Patent
Yang (10) Patent No.: US 12,132,366 B2
(45) Date of Patent: Oct. 29, 2024

(54) IN-WHEEL WORKING DEVICE

(71) Applicant: HYUNDAI MOBIS Co., Ltd., Seoul (KR)

(72) Inventor: Hae Jun Yang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 152 days.

(21) Appl. No.: 17/670,496

(22) Filed: Feb. 13, 2022

(65) Prior Publication Data

US 2022/0239208 A1  Jul. 28, 2022

Related U.S. Application Data

(62) Division of application No. 16/035,705, filed on Jul. 16, 2018, now abandoned.

(30) Foreign Application Priority Data

Jul. 18, 2017 (KR) .......... 10-2017-0090813
Jun. 19, 2018 (KR) .......... 10-2018-0069974

(51) Int. Cl.
*H02K 24/00* (2006.01)
*B60K 1/00* (2006.01)
*B60K 7/00* (2006.01)
*B60K 17/04* (2006.01)
(Continued)

(52) U.S. Cl.
CPC .............. *H02K 24/00* (2013.01); *B60K 1/00* (2013.01); *B60K 7/00* (2013.01); *B60K 7/0007* (2013.01); *B60K 17/046* (2013.01); *H02K 5/24* (2013.01); *H02K 7/006* (2013.01); *H02K 7/116* (2013.01); *H02K 11/21* (2016.01); *B60K 2007/0038* (2013.01); *B60K 2007/0092* (2013.01)

(58) Field of Classification Search
CPC .......... H02K 24/00; H02K 5/24; H02K 7/006; H02K 7/116; H02K 11/21; B60K 1/00; B60K 7/00; B60K 7/0007; B60K 17/046; B60K 2007/0038; B60K 2007/0092
USPC .................................................... 310/51, 68 B
See application file for complete search history.

(56) References Cited

U.S. PATENT DOCUMENTS 5,246,082 A   9/1993   Alber
5,988,692 A  11/1999   Springer
(Continued)

FOREIGN PATENT DOCUMENTS

JP    H05261132    10/1993
JP    2002-039794   2/2002
(Continued)

OTHER PUBLICATIONS

Non-Final Office Action mailed May 3, 2021, in U.S. Appl. No. 16/035,705.
(Continued)

*Primary Examiner* — Alex W Mok
(74) *Attorney, Agent, or Firm* — NSIP Law (57) ABSTRACT

An in-wheel working device including: a stator fixed to the inside of a housing, a rotor rotatably installed in the stator, a rotating part rotatably installed in the housing, and rotated with the rotor, a resolver fixing part fixed to the inside of the housing, and a resolver moving part. The resolver moving part includes a resolver rotor positioned outside the resolver fixing part and facing the resolver fixing part, and a cover part fixed to the rotating part and covering the resolver rotor.

7 Claims, 8 Drawing Sheets

(51) Int. Cl.
  *H02K 5/24* (2006.01)
  *H02K 7/00* (2006.01)
  *H02K 7/116* (2006.01)
  *H02K 11/21* (2016.01)

(56) References Cited

U.S. PATENT DOCUMENTS

| | | | |
|---|---|---|---|
| 7,350,605 | B2 | 4/2008 | Mizutani et al. |
| 8,678,115 | B2 | 3/2014 | Kasuya et al. |
| 9,429,149 | B2 | 8/2016 | Haung |
| 2003/0213322 | A1 | 11/2003 | Yabe |
| 2011/0169382 | A1* | 7/2011 | Coleman ............... H02K 24/00 310/68 B |
| 2012/0032544 | A1 | 2/2012 | Kasuya et al. |
| 2013/0221810 | A1 | 8/2013 | Gopalakrishnan et al. |
| 2014/0001926 | A1 | 1/2014 | Cho et al. |
| 2014/0069432 | A1 | 3/2014 | Mebasser et al. |
| 2014/0070649 | A1* | 3/2014 | Fulton ..................... G01D 5/12 29/598 |
| 2014/0070672 | A1 | 3/2014 | Gale |
| 2016/0319828 | A1 | 11/2016 | Song et al. |
| 2019/0028008 | A1 | 1/2019 | Yang |
| 2019/0032728 | A1 | 1/2019 | Sato et al. |
| 2022/0239208 | A1* | 7/2022 | Yang ....................... B60K 1/00 |

FOREIGN PATENT DOCUMENTS

| | | |
|---|---|---|
| JP | 2005081872 | 3/2005 |
| JP | 2012039763 | 2/2012 |

OTHER PUBLICATIONS

Final Office Action mailed Aug. 23, 2021, in U.S. Appl. No. 16/035,705.
Non-Final Office Action mailed Dec. 15, 2021, in U.S. Appl. No. 16/035,705.
Non-Final Office Action dated Aug. 8, 2022, issued to U.S. Appl. No. 16/035,705.
Final Office Action dated Jul. 18, 2023, in U.S. Appl. No. 16/035,705.
Office Action dated Apr. 4, 2022, issued to U.S. Appl. No. 16/035,705.
Office Action dated Jan. 1, 2023, issued to Korean Patent Application No. 10-2018-0069974.
Final Office Action dated Dec. 7, 2022, issued to U.S. Appl. No. 16/035,705.
Non-Final Office Action dated Mar. 24, 2023, issued to U.S. Appl. No. 16/035,705.
Non-Final Office Action dated Oct. 4, 2023, in U.S. Appl. No. 17/670,497.

\* cited by examiner

FIG. 8 form a part of this specification, illustrate

IN-WHEEL WORKING DEVICE

CROSS-REFERENCES TO RELATED APPLICATIONS

This application is a Division of U.S. patent application Ser. No. 16/035,705, filed on Jul. 16, 2018, which claims priority from and the benefit of Korean Patent Application No. 10-2017-0090813, filed on Jul. 18, 2017, and Korean Patent Application No. 10-2018-0069974, filed on Jun. 19, 2018, each of which is hereby incorporated by reference for all purposes as if set forth herein.

BACKGROUND

Field

Exemplary embodiments relate to an in-wheel working device, and more particularly, to an in-wheel working device which can secure a space for installing a gear shift in a rotor by changing a structure for measuring rotation of a motor.

Discussion of the Background

The exhaustion of fossil fuels has promoted the development of electric vehicles which drive a motor using electric energy stored in a battery, instead of vehicles using the fossil fuels such as gasoline and diesel.

Electric vehicles may be divided into a pure electric vehicle that drives a motor using only electric energy stored in a rechargeable battery, a solar cell vehicle that drives a motor using a photoelectric cell, a fuel cell vehicle that drives a motor using a fuel cell based on hydrogen fuel, and a hybrid vehicle that uses an engine and motor together by driving the engine using fossil fuel and driving the motor using electricity.

In general, an in-wheel working device is a technique used for a vehicle, such as an electric vehicle, which uses electricity as a power source. Unlike a system that rotationally drives wheels using power transferred through an engine, transmission, and drive shaft of a gasoline or diesel vehicle, the in-wheel working device directly transfers power to the wheels using motors arranged in left and right drive wheels or four left/right and front/rear drive wheels.

Since a resolver for measuring rotation of the motor in the conventional in-wheel working device is installed on a rotating shaft of the motor, the size of the in-wheel working device is increased, which makes it difficult to additionally install a gear shift in a rotor. In this case, the power of the vehicle may be reduced. Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the invention are directed to an in-wheel working device which can secure a space for installing a gear shift in a rotor by changing a structure for measuring rotation of a motor, thereby improving mounting compatibility and power.

An exemplary embodiment of the invention provides an in-wheel working device including: a stator fixed to the inside of a housing; a rotor rotatably installed in the stator; a rotating part rotatably installed in the housing, and rotated with the rotor; a resolver fixing part fixed to the inside of the housing; and a resolver moving part. The resolver moving part includes a resolver rotor positioned outside the resolver fixing part facing the resolver fixing part, and a cover part fixed to the rotating part and covering the resolver rotor.

The cover part may be injection-molded in a shape to cover the resolver rotor.

The rotating part may include a mounting frame installed in a shape to cover the rotor; and a motor shaft connected to the mounting frame, having a hollow portion formed therein, and rotatably installed in the housing.

The cover part may have a larger inner diameter than the outer diameter of the resolver fixing part, and fixed to the mounting frame.

The in-wheel working device may further include: a gear shift part configured to shift gears using power received from the motor shaft; and a drive shaft formed in a shaft shape passing through the inside of the motor shaft, and rotated by power received from the gear shift part.

The cover part may include a first cover installed in a shape to cover one side of the resolver rotor; and a second cover installed in a shape to cover the other side of the resolver rotor.

The first cover may include a first base forming a plane in a circular arc shape at a position facing the one side of the resolver rotor; a first inner member extended from the inner circumference of the first base toward the second cover; and a first outer member extended from the outer circumference of the first base toward the second cover.

The second cover may include a second base forming a plane in a circular arc shape at a position facing the other side of the resolver rotor; a second inner member extended from the inner circumference of the second base toward the first cover; and a second outer member extended from the outer circumference of the second base toward the first cover.

Another exemplary embodiment of the invention provides an in-wheel working device including: a stator fixed to the inside of a housing; a rotor rotatably installed in the stator; a rotating part rotatably installed in the housing, and rotated with the rotor; a resolver fixing part fixed to the inside of the housing; and a resolver rotor positioned outside the resolver fixing part facing the resolver fixing part. The resolver rotor is fixed to the rotating part, rotated with the rotating part, and implemented with a single member.

The resolver rotor may include a rotor body forming a plane in a belt shape along a circular arc shape; and an inner groove forming a polygonal groove in the rotor body.

The rotating part may include a mounting frame installed in a shape to cover the rotor; and a motor shaft connected to the mounting frame, having a hollow portion formed therein, and rotatably installed in the housing.

The rotor body may be fixed to the mounting frame by a fastening member.

The rotor body may have a plurality of mounting grooves formed along the outer circumference thereof, and the mounting grooves directly mounted on the mounting frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an in-wheel working device in accordance with an exemplary embodiment of the invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
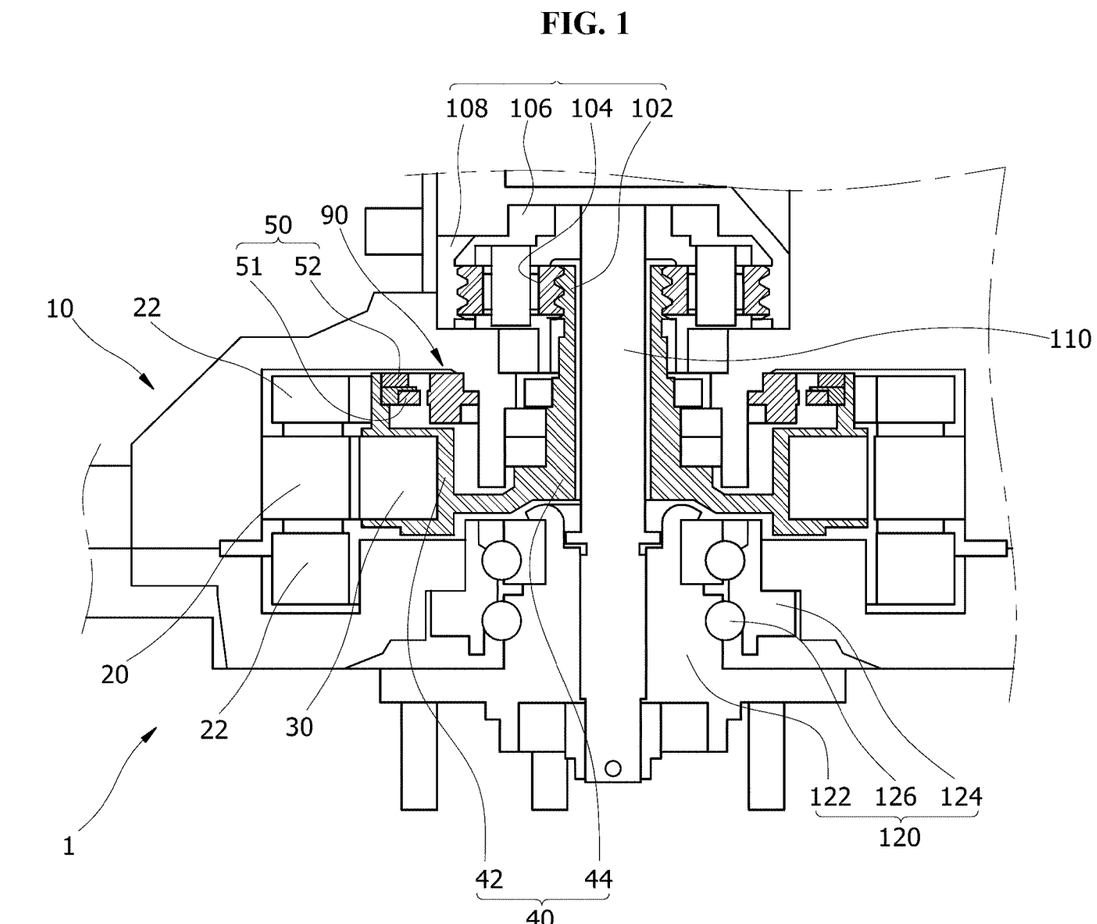
FIG. 1 schematically illustrates the structure of an in-wheel working device in accordance with a first embodiment of the present invention.
Figure 2:
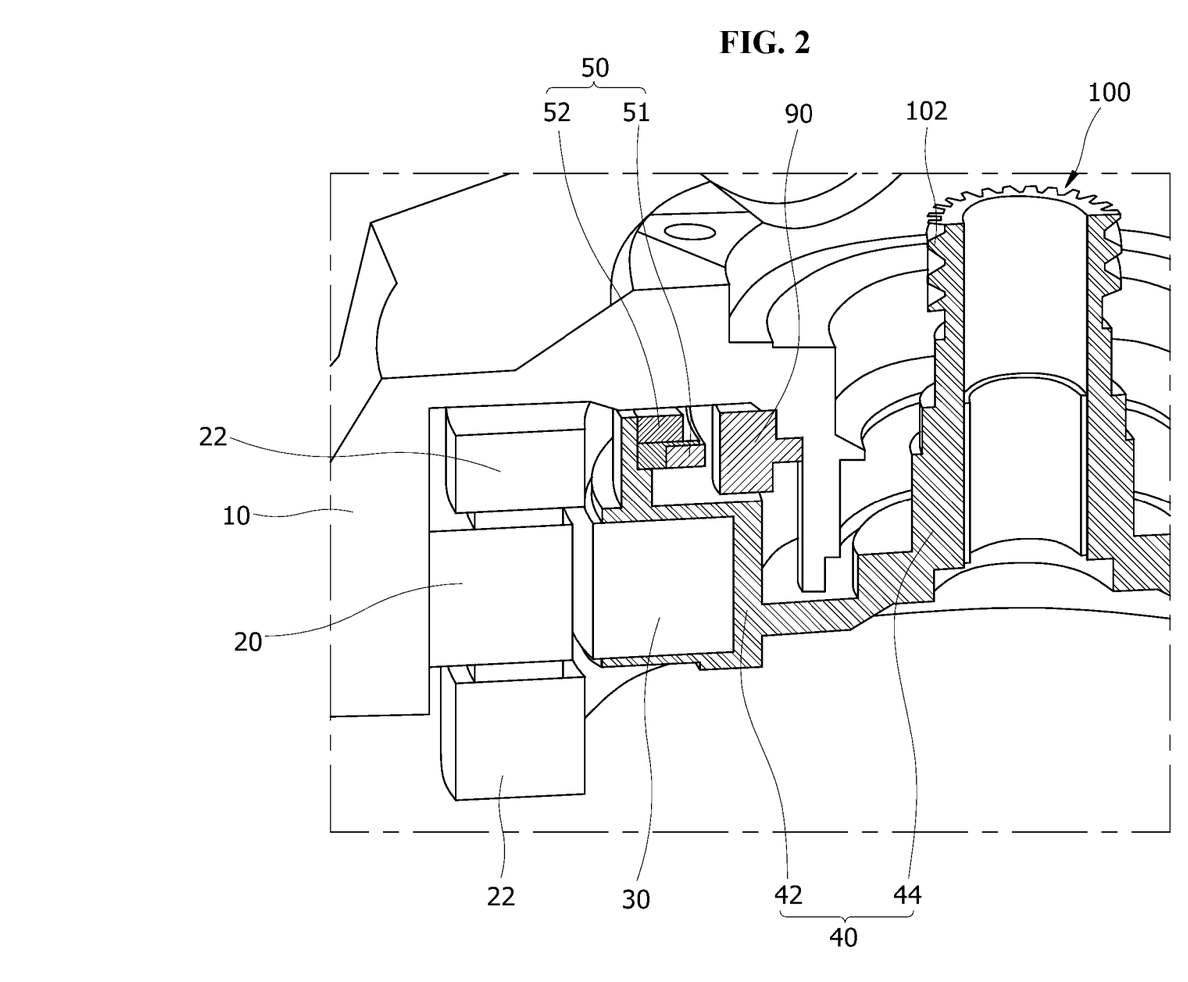
FIG. 2 illustrates an installation state of a resolver moving part and a resolver fixing part in accordance with the first embodiment of the present invention.
Figure 3:
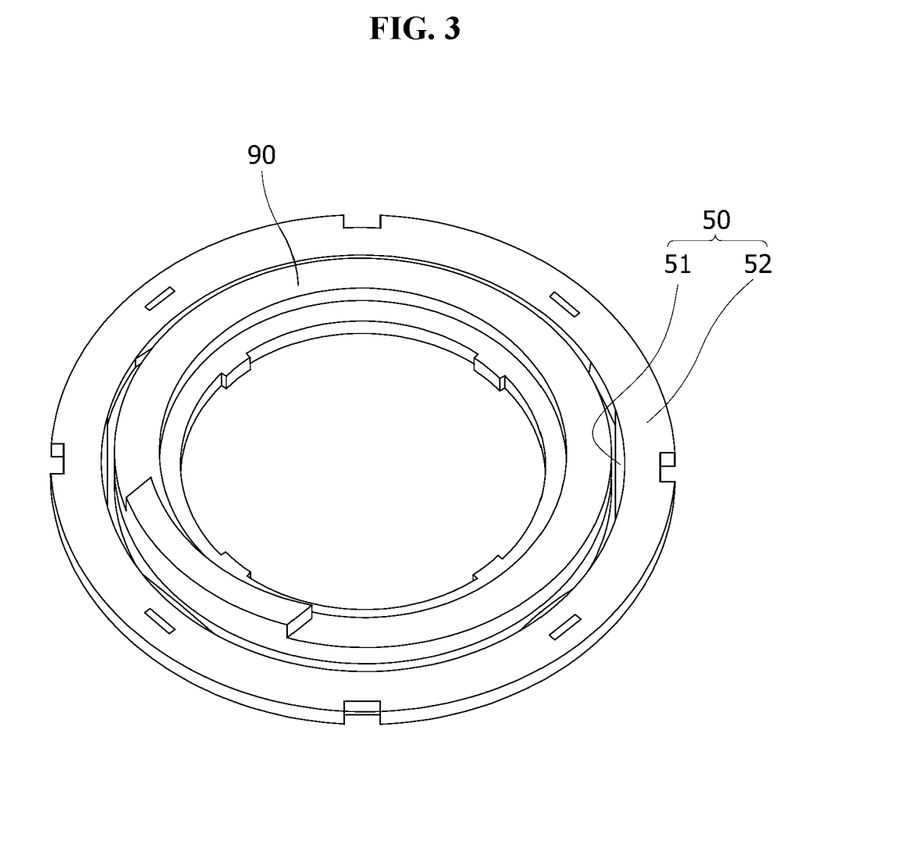
FIG. 3 illustrates the resolver moving part and the resolver fixing part in accordance with the first embodiment of the present invention.

FIG. 1 schematically illustrates the structure of an in-wheel working device in accordance with a first embodiment of the present invention, FIG. 2 illustrates an installation state of a resolver moving part and a resolver fixing part in accordance with the first embodiment of the present invention, and FIG. 3 illustrates the resolver moving part and the resolver fixing part in accordance with the first embodiment of the present invention.

As illustrated in FIGS. 1 to 3, the in-wheel working device 1 in accordance with the embodiment of the present invention may include a stator 20 fixed to the inside of a housing 10, a rotor 30 rotatably installed in the stator 20, a rotating part 40 rotatably installed in the housing 10 and rotated with the rotor 30, a resolver moving part 50 fixed to the rotating part 40 and rotated with the rotating part 40, and a resolver fixing part 90 fixed to the inside of the housing 10 facing the resolver moving part 50.

The housing 10 forming the exterior of the in-wheel working device 1 may be fixed to a vehicle body, and the stator 20, the rotor 30, the rotating part 40, the resolver moving part 50, the resolver fixing part 90, a gear shift part 100, a drive shaft 110 and a hub part 120 may be installed in the housing 10.

The stator 20 may be formed in a ring shape, and fixed to the inside of the housing 10. The stator 20 may have coil members 22 installed at the top and bottom thereof, respectively, and the rotations of the stator 20 and the coil member 22 may be constrained.

The rotor 30 may be rotatably installed in the stator 20, and rotated according to flux changes of the stator 20 and the coil member 22. The rotor 30 may be formed in a ring shape, and have a magnetic force. Since the detailed configurations and operations of the stator 20 and the rotor 30 are publicly known, the detailed descriptions thereof are omitted herein.

The rotating part 40 may be formed in various shapes, as long as the rotating part 40 can be rotatably installed in the housing 10 and rotated with the rotor 30. The rotating part 40 in accordance with the present embodiment may include a mounting frame 42 and a motor shaft 44. The mounting frame 42 may be formed in a plate shape which is brought in contact with one side surface and the top and bottom surfaces of the rotor 30 with a rectangular cross-section, and connected to the rotor 30 so as to rotate with the rotor 30. The mounting frame 42 may have a protrusion formed at the top thereof, and the resolver moving part 50 may be fixed to the protrusion. Therefore, the rotating part 40, the rotor 30 and the resolver moving part 50 may be rotated together.

The motor shaft 44 may be connected to the mounting frame 42 and rotated with the mounting frame 42. Furthermore, the motor shaft 44 may be rotatably installed in the housing 10, and have a hollow portion formed therein. The motor shaft 44 may be extended in the top-to-bottom direction, the gear shift part 100 may be installed at one side of the motor shaft 44, and the hub part 120 may be installed at the other side of the motor shaft 44.

The resolver moving part 50 may be fixed to the rotating part 40, and rotated with the rotating part 40. The resolver moving part 50 in accordance with the present embodiment may include a cover part 52 and a resolver rotor 51.

The cover part 52 may be formed through injection molding, fixed to the mounting frame 42, and have a larger inner diameter than the outer diameter of the resolver fixing part 90. The resolver rotor 51 may be fixed to the cover part 52, and positioned outside the resolver fixing part 90. Since the cover part 52 formed of synthetic resin is injection-molded in a shape to cover the resolver rotor 51, the resolver rotor 51 and the cover part 52 may be coupled as one body. Furthermore, since the cover part 52 is fixed to the outside of the mounting frame 42, the resolver moving part 50 may be rotated with the rotating part 40.

The resolver fixing part 90 may be fixed to the inside of the housing 10 facing the resolver moving part 50. Each of the resolver rotor 51 and the resolver fixing part 90 may have a two-phase winding, and detect the angular velocity and angular position of the rotating part 40 through a change of an output voltage value. For example, the coil of the resolver fixing part 90 may be wound in such a manner that flux distribution becomes a sine wave with respect to an angle. When the rotor 30 is rotated after an excitation voltage is applied to the primary coil corresponding to an input side, a voltage may be generated at the secondary coil corresponding to an output side while a magnetic coupling coefficient is changed. The coil of the resolver fixing part 90 may be wound in such a manner that the voltage is changed to the sine and cosine of the rotation angle of the rotor 30. The amplitude ratio of the sine output to the cosine output may be determined in order to recognize the rotation angle and position of the rotor 30. In addition, various resolver measurement techniques can be applied in order to measure the angular position and angle of the rotor 30.

The resolver fixing part 90 may be formed in a ring shape and fixed to the inside of the housing 10, the inside of the resolver rotor 51 positioned outside the resolver fixing part 90 may form a polygonal groove, and the outside of the resolver rotor 51 may form a circular curved surface. The cover part 52 may have a larger outer diameter than the outer diameter of the resolver rotor 51, and injection-molded with the resolver rotor 51.

In order to reduce noise caused by the motor including the stator 20 and the rotor 30, the cover part 52 may be mounted outside the resolver rotor 51. Since the resolver moving part 50 is installed at the top of the rotor 30 or adjacent to the coil member 22, noise is highly likely to be generated by an electromagnetic force generated by the rotor 30 and the stator 20. Thus, the cover part 52 may be installed to cover the resolver rotor 51, such that a space for isolating the resolver rotor 51 from the rotor 30 can be secured while the electromagnetic force of the stator 20 and the rotor 30 is reduced. Therefore, noise can be reduced.

The in-wheel working device 1 in accordance with the embodiment of the present invention may further include the gear shift part 100, the drive shaft 110 and the hub part 120. The gear shift part 100 may include various types of gear shift devices, as long as the gear shift part 100 can shift gears using power received from the motor shaft 44. The gear shift part 100 in accordance with the embodiment of the present invention may include a sun gear 102, a planetary gear 104, a carrier 106 and a ring gear 108.

The sun gear 102 may be connected to the top of the motor shaft 44, and have gear teeth formed outside a pipe-shaped body thereof. Therefore, the sun gear 102 may be rotated with the motor shaft 44. The planetary gear 104 may be installed outside the sun gear 102, and the carrier 106 may rotatably support the planetary gear 104. The ring gear 108 positioned outside the carrier 106 may maintain a fixed state.

Since the carrier 106 is connected to the drive shaft 110, power reduced through the carrier 106 may be outputted through the drive shaft 110.

The drive shaft 110 may be formed in a shaft shape which passes through the inside of the motor shaft 44, and rotated by power received from the gear shift part 100. The top of the drive shaft 110 extended in the top-to-bottom direction may be connected to the carrier 106, and the bottom of the drive shaft 110 may be connected to a hub inner race 122 of the hub part 120 so as to receive rotation power.

The hub part 120 may include the hub inner race 122, a hub outer race 124 and a hub bearing 126. The hub inner race 122 may be spline-coupled to the drive shaft 110, and rotated with the drive shaft 110, the hub outer race 124 may be positioned outside the hub inner race 122, and the hub bearing 126 may be positioned between the hub inner race 122 and the hub outer race 124. The wheel of the vehicle may be rotated by the rotation of the hub inner race 122.

Hereafter, the operation state of the in-wheel working device 1 in accordance with the embodiment of the present invention will be described in detail with reference to the accompanying drawings.

The mounting frame 42 and the motor shaft 44 which constitute the rotating part 40 may be rotated by the rotation of the rotor 30. At this time, the cover part 52 and the resolver rotor 51 of the resolver moving part 50 fixed to the mounting frame 42 may also be rotated. Therefore, the resolver fixing part 90 may measure the angular velocity and angular position of the resolver moving part 50, in order to recognize the angular velocity and angular position of the rotor 30. Since the resolver moving part 50 and the resolver fixing part 90 which constitute the resolver are positioned at the top of the rotor 30, the gear shift part 100 can be installed at the top of the motor shaft 44 while an increase of the size is minimized.

The sun gear 102 may be rotated by the rotation of the motor shaft 44, and the carrier 106 supporting the planetary gear 104 may be rotated while the velocity thereof is reduced. The drive shaft 110 connected to the carrier 106 may transfer power to the spline-coupled hub inner race 122, and the wheel of the vehicle may be rotated by the rotation of the hub inner race 122.

In accordance with the embodiment of the present invention, since the resolver moving part 50 and the resolver fixing part 90 for measuring the rotation of the rotor 30 are installed in the stator 20, the installation space of the gear shift part 100 for changing the output of the rotating part 40 can be secured, which makes it possible to improve the power of the vehicle.

Figure 4:
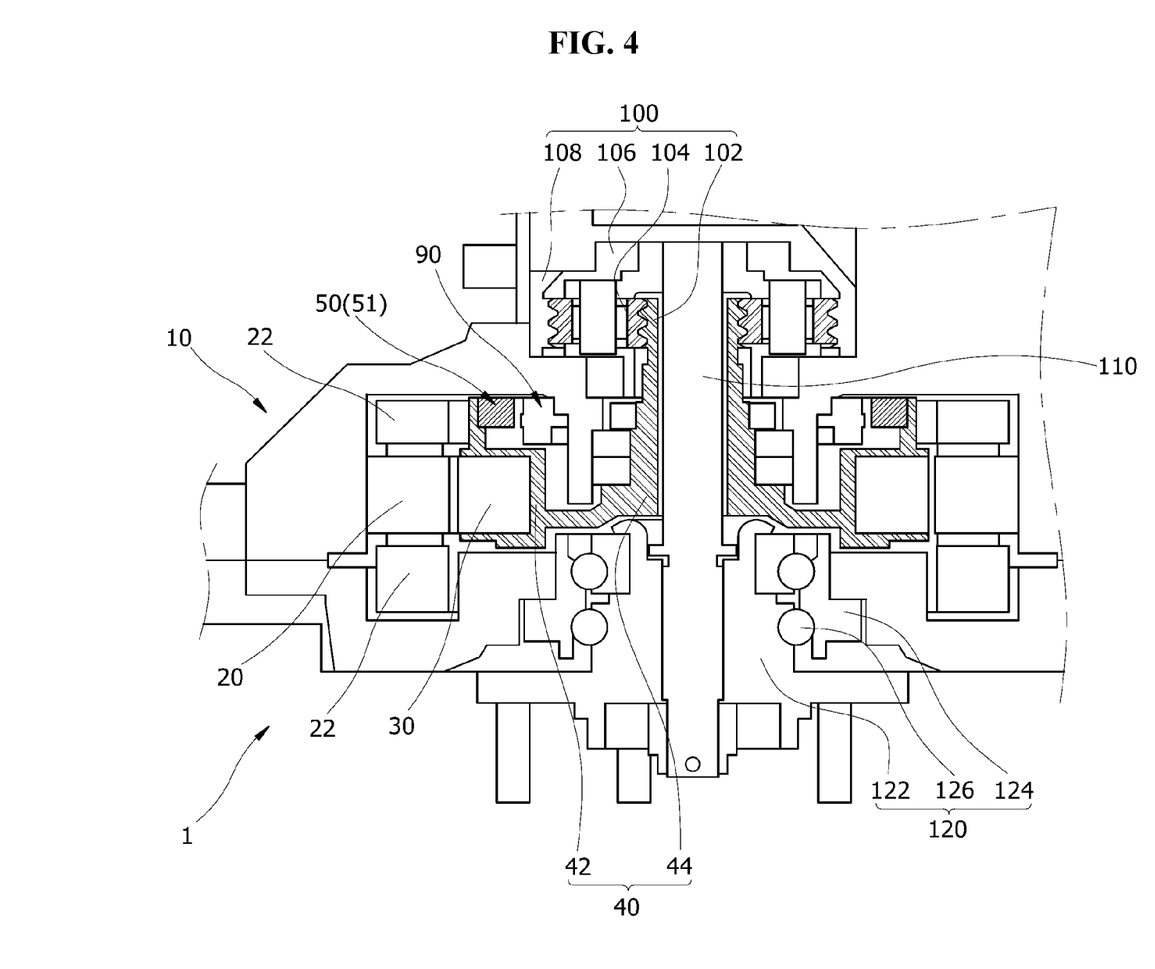
FIG. 4 schematically illustrates the structure of an in-wheel working device in accordance with a second embodiment of the present invention.
Figure 5:
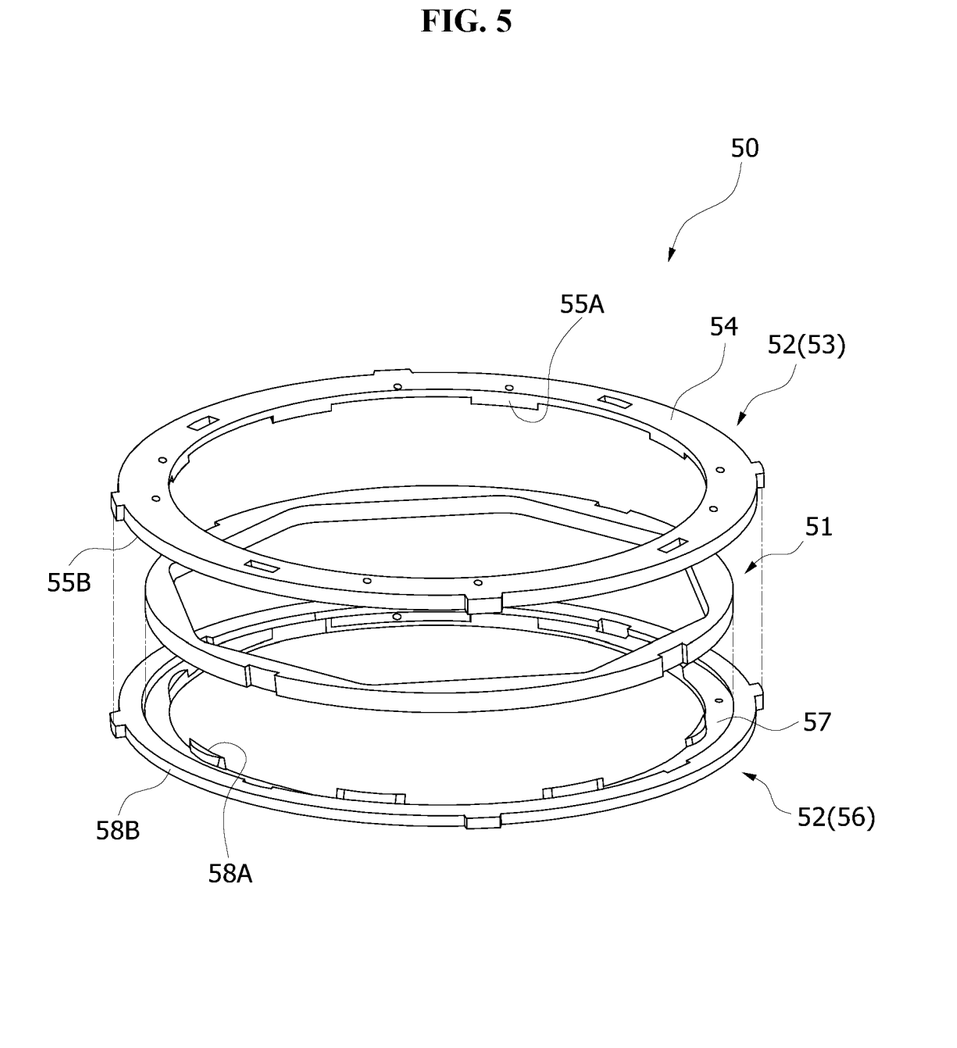
FIG. 5 is an exploded perspective view of a resolver moving part in accordance with the second embodiment of the present invention.
Figure 6:
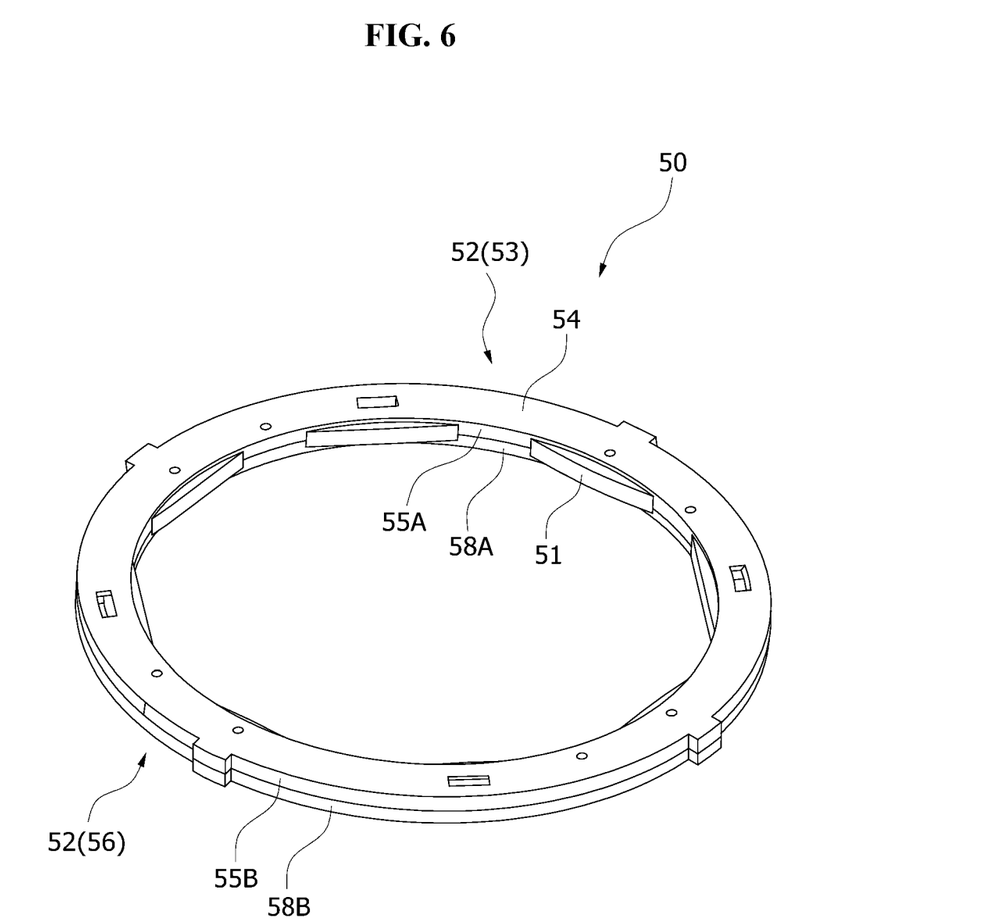
FIG. 6 is an assembled perspective view of the resolver moving part in accordance with the second embodiment of the present invention.

FIG. 4 schematically illustrates the structure of an in-wheel working device in accordance with a second embodiment of the present invention, FIG. 5 is an exploded perspective view of a resolver moving part in accordance with the second embodiment of the present invention, and FIG. 6 is an assembled perspective view of the resolver moving part in accordance with the second embodiment of the present invention.

As illustrated in FIGS. 4 to 6, the in-wheel working device 1 in accordance with the second embodiment of the present invention may include a stator 20 fixed to the inside of a housing 10, a rotor 30 rotatably installed in the stator 20, a rotating part 40 rotatably installed in the housing 10 and rotated with the rotor 30, a resolver moving part 50 fixed to the rotating part 40, rotated with the rotating part 40, and implemented by a plurality of members, and a resolver fixing part 90 fixed to the inside of the housing 10 facing the resolver moving part 50.

The housing 10 forming the exterior of the in-wheel working device 1 may be fixed to the vehicle body, and the stator 20, the rotor 30, the rotating part 40, the resolver moving part 50, the resolver fixing part 90, a gear shift part 100, a drive shaft 110 and a hub part 120 may be installed in the housing 10.

The stator 20 may be formed in a ring shape, and fixed in the housing 10. The stator 20 may have coil members 22 installed at the top and bottom thereof, and the stator 20 and the coil members 22 may be constrained from rotating.

The rotor 30 may be rotatably installed in the stator 20, and rotated according to flux changes of the stator 20 and the coil member 22. The rotor 30 may be formed in a ring shape, and have a magnetic force. Since the detailed configurations and operations of the stator 20 and the rotor 30 are publicly known, the detailed descriptions thereof are omitted herein.

The rotating part 40 may be formed in various shapes, as long as the rotating part 40 can be rotatably installed in the housing 10 and rotated with the rotor 30. The rotating part 40 in accordance with the second embodiment may include a mounting frame 42 and a motor shaft 44. The mounting frame 42 may be formed in a plate shape which is brought in contact with one side surface and the top and bottom surfaces of the rotor 30, and the rotor 30 may be connected to the mounting frame 42 and rotated with the mounting frame 42.

The mounting frame 42 may have a protrusion formed at the top thereof, and the resolver moving part 50 may be fixed to the protrusion. Therefore, the rotating part 40, the rotor 30 and the resolver moving part 50 may be rotated together.

The motor shaft 44 may be connected to the mounting frame 42 and rotated with the mounting frame 42. Furthermore, the motor shaft 44 may be rotatably installed in the housing 10, and have a hollow portion formed therein. The motor shaft 44 may be extended in the top-to-bottom direction, the gear shift part 100 may be installed at one side of the motor shaft 44, and the hub part 120 may be installed at the other side of the motor shaft 44.

The resolver moving part 50 may be fixed to the rotating part 40, and rotated with the rotating part 40. The resolver moving part 50 in accordance with the second embodiment may include a resolver rotor 51 and a cover part 52. The cover part 52 may include a first cover 53 and a second cover 56.

The resolver rotor 51 may be formed in a ring shape and positioned outside the resolver fixing part 90, the inside of the resolver rotor 51 may form a polygonal groove, and the outside of the resolver rotor 51 may form a circular curved surface.

The first cover 53 may be installed in a shape to cover one side of the resolver rotor 51, and the second cover 56 may be installed in a shape to cover the other side of the resolver rotor 51. The first and second covers 53 and 56 may be injection-molded separately from the resolver rotor 51, and then coupled to the resolver rotor 51 so as to form an assembly. The resolver rotor 51 may be used in common, and the first and second covers 53 and 56 may be manufactured in a package shape and coupled to the resolver rotor 51, which makes it possible to remove a problem that the manufacturing cost is increased by a model change.

The first and second covers 53 and 56 may be formed through injection molding, fixed to the mounting frame 42, and have a larger inner diameter than the outer diameter of the resolver fixing part 90. The resolver rotor 51 may be positioned between the first and second covers 53 and 56. The first and second covers 53 and 56 may be formed of synthetic resin, injection-molded separately from the resolver rotor 51, and installed in a shape to cover the resolver rotor 51. Furthermore, since the first and second covers 53 and 56 are fixed to the outside of the mounting frame 42, the resolver moving part 50 may be rotated with the rotating part 40.

The first cover 53 in accordance with the second embodiment may include a first base 54, a plurality of first inner members 55A and a first outer member 55B. The first base 54 may form a plane in a circular arc shape at a position facing the one side of the resolver rotor 51.

The first inner members 55A may be extended from the inner circumference of the first base 54 toward the second cover 56. The first inner members 55A may be installed along the inner circumference of the first base 54 so as to be spaced at preset intervals.

The first outer member 55B may be extended from the outer circumference of the first base 54 toward the second cover 56. Between the first inner members 55A and the first outer member 55B, a groove for seating the resolver rotor 51 may be formed. The first outer member 55B may be extended in a ring shape while having a level difference from the first base 54.

The second cover 56 in accordance with the second embodiment may include a second base 57, a plurality of second inner members 58A and a second outer member 58B. The second base 57 may form a plane in a circular arc shape at a position facing the other side of the resolver rotor 51.

The second inner members 58A may be extended from the inner circumference of the second base 57 toward the first cover 53. The second inner members 58A may be installed along the inner circumference of the second base 57 so as to be spaced at preset intervals.

The second outer member 58B may be extended from the outer circumference of the second base 57 toward the first cover 53. Between the second inner members 58A and the second outer member 58B, a groove for seating the resolver rotor 51 may be formed. The second outer member 58B may be extended in a ring shape while having a level difference from the second base 57.

With the resolver rotor 51 positioned between the first and second covers 53 and 56, the first inner member 55A may be brought in contact with the second inner member 58A and constrained from moving, and the first outer member 55B may also be brought in contact with the second outer member 58B and constrained from moving. The first and second covers 53 and 56 may be fixed through a bolt or adhesive. Alternatively, the first and second covers 53 and 56 may be fixed to each other through various coupling methods such as laser welding and thermal welding.

In order to reduce noise caused by the motor including the stator 20 and the rotor 30, the first and second covers 53 and 56 may be mounted on the outside of the resolver rotor 51. Since the resolver moving part 50 is installed at the top of the rotor 30 or adjacent to the coil member 22, noise is likely to be caused by an electromagnetic force generated by the rotor 30 and the stator 20. Therefore, the first and second covers 53 and 56 may be installed to cover the resolver rotor 51, such that a space for isolating the resolver rotor 51 from the rotor 30 can be secured while reducing the electromagnetic force of the stator 20 and the rotor 30, transferred to the resolver rotor 51. Thus, noise can be reduced.

The resolver fixing part 90 may be fixed to the inside of the housing 10 facing the resolver moving part 50. Each of the resolver rotor 51 and the resolver fixing part 90 may have a two-phase winding, and detect an angular velocity and angular position of the rotating part 40 through a change of an output voltage. For example, the coil of the resolver fixing part 90 may be wound in such a manner that flux distribution becomes a sine wave with respect to an angle. When the rotor 30 is rotated after an excitation voltage is applied to the primary coil corresponding to an input side, a voltage may be generated at the secondary coil corresponding to an output side while a magnetic coupling coefficient is changed. The coil of the resolver fixing part 90 may be wound in such a manner that the voltage is changed to the sine and cosine of the rotation angle of the rotor 30. The amplitude ratio of the sine output to the cosine output may be determined in order to recognize the rotation angle and position of the rotor 30. In addition, various resolver measurement techniques can be applied in order to measure the rotation position and angle of the rotor 30. Since the resolver fixing part 90 in accordance with the second embodiment is formed in a ring shape and fixed to the inside of the housing 10, the rotation of the resolver fixing part 90 may be constrained.

The in-wheel working device 1 in accordance with the second embodiment of the present invention may further include the gear shift part 100, the drive shaft 110 and the hub part 120. The gear shift part 100 may include various types of gear shift devices, as long as the gear shift part 100 can shift gears using power received from the motor shaft 44. The gear shift part 100 in accordance with the second embodiment may include a sun gear 102, a planetary gear 104, a carrier 106 and a ring gear 108.

The sun gear 102 may be connected to the top of the motor shaft 44, and have gear teeth formed on the outside of the pipe-shaped body thereof. Therefore, the sun gear 102 may be rotated with the motor shaft 44. The planetary gear 104 may be installed outside the sun gear 102, and the carrier 106 may rotatably support the planetary gear 104. The ring gear 108 positioned outside the carrier 106 may maintain a fixed state.

Since the carrier 106 is connected to the drive shaft 110, power reduced through the carrier 106 may be outputted through the drive shaft 110.

The drive shaft 110 may be formed in a shaft shape which passes through the inside of the motor shaft 44, and rotated by power received from the gear shift part 100. The top of the drive shaft 110 extended in the top-to-bottom direction may be connected to the carrier 106, and the bottom of the drive shaft 110 may be connected to a hub inner race 122 of the hub part 120 so as to receive rotation power.

The hub part 120 may include the hub inner race 122, a hub outer race 124 and a hub bearing 126. The hub inner race 122 may be spline-coupled to the drive shaft 110 and rotated with the drive shaft 110, the hub outer race 124 may be positioned outside the hub inner race 122, and the hub bearing 126 may be positioned between the hub inner race 122 ad the hub outer race 124. The wheels of the vehicle may be rotated by the rotation of the hub inner race 122.

Hereafter, the operation state of the in-wheel working device 1 in accordance with the second embodiment of the present invention will be described in detail with reference to the accompanying drawings.

The mounting frame 42 and the motor shaft 44 which constitute the rotating part 40 may be rotated by the rotation of the rotor 30. At this time, the first and second covers 53 and 56 and the resolver rotor 2 of the resolver moving part 50 fixed to the mounting frame 42 may also be rotated. Therefore, the resolver fixing part 90 may measure the angular velocity and angular position of the resolver moving part 50, in order to recognize the angular velocity and angular position of the rotor 30. Since the resolver moving part 50 and the resolver fixing part 90 which constitute the resolver are positioned at the top of the rotor 30, the gear shift part 100 may be installed at the top of the motor shaft 44 while an increase of the size is minimized.

The sun gear 102 may be rotated by the rotation of the motor shaft 44, and the carrier 106 supporting the planetary gear 104 may be rotated while the velocity thereof is reduced. The drive shaft 110 connected to the carrier 106 may transfer power to the spline-coupled hub inner race 122, and the wheels of the vehicle may be rotated by the rotation of the hub inner race 122.

Even when the model is changed, the resolver rotor 51 can be used in common, and only the first and second covers 53 and 56 may be separately manufactured, which makes it possible to save the manufacturing cost and distribution cost. Furthermore, only the first and second covers 53 and 56 may be separately manufactured and applied to a package, and various assembly structures can be applied depending to the shapes of the first and second covers 53 and 56.

Hereafter, an in-wheel working device 1 in accordance with another embodiment of the present invention will be described with reference to the drawings.

For convenience of description, components which are configured and operated in the same manner as those of the second embodiment are represented by like reference numerals, and the detailed descriptions thereof are omitted herein.

Figure 7:
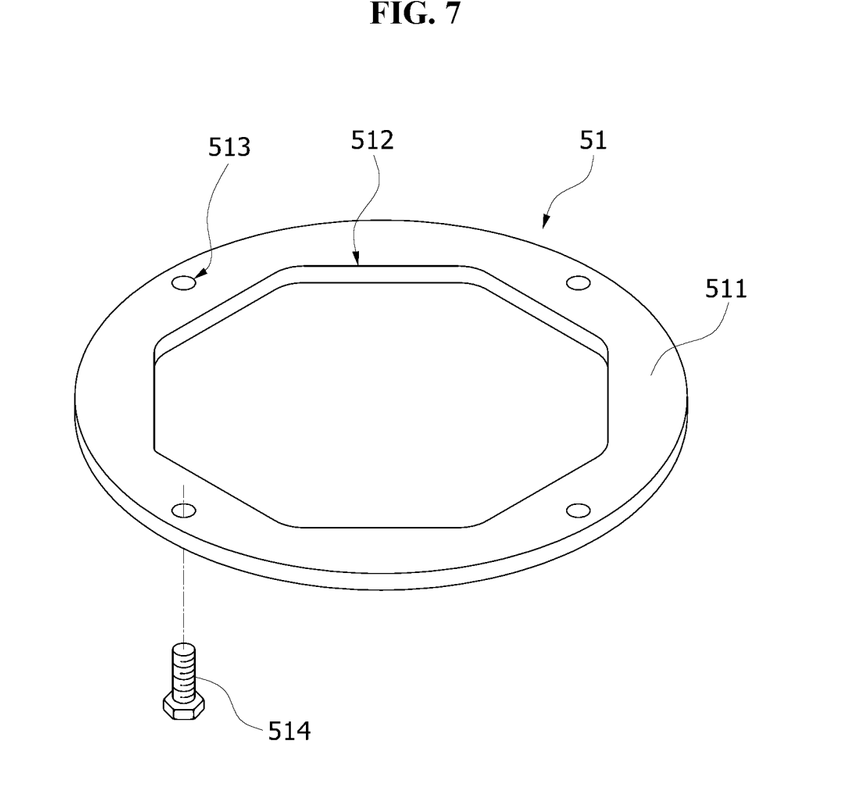
FIG. 7 is a perspective view illustrating that a resolver rotor in accordance with the present embodiment has fastening holes formed therein.

FIG. 7 is a perspective view illustrating that a resolver rotor in accordance with the present embodiment has fastening holes formed therein.

As illustrated in FIGS. 4 to 7, the in-wheel working device 1 in accordance with the present embodiment may include a stator 20 fixed to the inside of a housing 10, a rotor 30 rotatably installed in the stator 20, a rotating part 40 rotatably installed in the housing 10 and rotated with the rotor 30, a resolver rotor 51 fixed to the rotating part 40, rotated with the rotating part 40, and implemented with a single member, and a resolver fixing part 90 fixed to the inside of the housing 10 facing the resolver rotor 51.

The resolver rotor 51 in accordance with the present embodiment is positioned outside the resolver fixing part 90 and fixed to the rotating part 40. The resolver rotor 51 in accordance with the present embodiment may include a rotor body 511, an inner groove 512 and a plurality of fastening holes 513.

The rotor body 511 may form a plane in a belt shape along a circular arc shape. The outside of the rotor body 511 may form a circular curved surface. The inner groove 512 may form a polygonal groove in the rotor body 511.

The plurality of fastening holes 513 may be used to install a fastening member 514 in the rotor body 511. The fastening member 514 may be a bolt. The plurality of fastening holes 513 may be formed along the rotor body 511, and the fastening member 514 may be fixed to the mounting frame 42 through the fastening holes 513 formed in the rotor body 511. Therefore, the resolver rotor 51 may be directly mounted on the rotating part 40 without a separate cover part, and rotated with the rotating part 40.

When the resolver rotor 51 and the resolver fixing part 90 are spaced at a sufficient distance from the stator 20 to generate electromagnetic waves, the resolver rotor 51 may be directly mounted on the rotating part 40 without a separate cover part. When the resolver rotor 51 and the resolver fixing part 90 are installed close to the drive shaft 110 serving as a motor rotating shaft, the influence of electromagnetic noise may be limited. Therefore, the resolver rotor 51 may be directly fastened to the rotating part 40 or the drive shaft 110.

Figure 8:
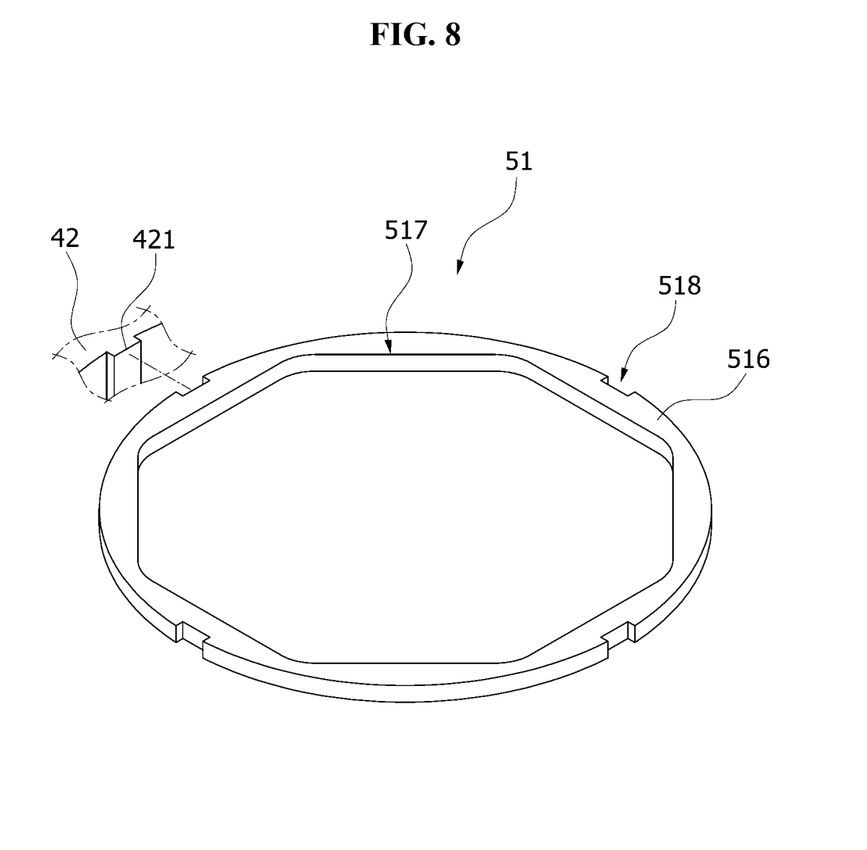
FIG. 8 is a perspective view illustrating that a resolver rotor in accordance with another embodiment of the present invention has mounting grooves.

FIG. 8 is a perspective view illustrating that a resolver rotor in accordance with another embodiment of the present invention has mounting grooves.

As illustrated in FIGS. 4 and 8, the resolver rotor 51 in accordance with the present embodiment may include a rotor body 516, an inner groove 517 and a plurality of mounting grooves 518.

The rotor body 516 may form a plane in a belt shape along a circular arc shape. The outside of the rotor body 516 may form a circular curved surface. The inner groove 517 may form a polygonal groove in the rotor body 516.

The plurality of mounting grooves 518 may be formed along the outer circumference of the rotor body 516. The plurality of mounting grooves 518 may be installed at preset intervals on the outer circumference of the rotor body 516. Therefore, separate protrusions 421 formed on the mounting frame 42 of the rotating part 40 may be inserted into the mounting grooves 518. Thus, the resolver rotor 51 may be directly mounted on the rotating part 40 without a separate cover part, and rotated with the rotating part 40.

As described above, the first and second covers 53 and 56 may be injection-molded as separate products and coupled to the resolver rotor 51. Thus, since the resolver rotor 51 can be used in common, the manufacturing cost can be reduced.

Furthermore, since the resolver rotor 51 is directly fixed to the rotating part 40 without a separate cover part, the space can be utilized more efficiently.

Furthermore, since the rotor 51 or the resolver moving part 60 and the resolver fixing part 90 for measuring the rotation of the rotor 30 are installed in the stator 20, the installation space of the gear shift part 100 for changing the output of the rotating part 40 can be secured, which makes it possible to improve the power of the vehicle.

Although exemplary embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An in-wheel working device comprising:
    a stator fixed to the inside of a housing;
    a rotor rotatably installed in the stator;
    a rotating part rotatably installed in the housing, the rotating part being configured to be rotated with the rotor;
    a resolver fixing part fixed to the inside of the housing; and
    a resolver moving part comprising:
    a resolver rotor positioned outside the resolver fixing part facing the resolver fixing part; and
    a cover part fixed to the rotating part and covering the resolver rotor,
    wherein:
    the cover part comprises:
        a first cover installed in a shape to cover a first side of the resolver rotor, the first cover comprising a first base forming a plane in a circular arc shape at a position facing the first side of the resolver rotor; and
        a second cover installed in a shape to cover a second side of the resolver rotor opposite the first side, the second cover comprising a second base forming a plane in a circular arc shape at a position facing the second side of the resolver rotor; and
    an inner circumference of the first base is equal to an inner circumference of the second base.

2. The in-wheel working device of claim 1, wherein the first cover further comprises:
    a first inner member extended from the inner circumference of the first base toward the second cover; and
    a first outer member extended from an outer circumference of the first base toward the second cover.

3. The in-wheel working device of claim 1, wherein the second cover further comprises:
    a second inner member extended from the inner circumference of the second base toward the first cover; and
    a second outer member extended from an outer circumference of the second base toward the first cover.

4. The in-wheel working device of claim 1, wherein the resolver rotor is fixed to the rotating part, configured to be rotated with the rotating part, and implemented with a single member.

5. The in-wheel working device of claim 4, wherein the resolver rotor comprises:
    a rotor body forming a plane in a belt shape along a circular arc shape; and
    an inner groove forming a polygonal groove in the rotor body.

6. The in-wheel working device of claim 5, wherein the rotating part comprises:
    a mounting frame installed in a shape to cover the rotor; and
    a motor shaft connected to the mounting frame, having a hollow portion formed therein, and rotatably installed in the housing.

7. The in-wheel working device of claim 6, wherein the rotor body has a plurality of mounting grooves formed along the outer circumference thereof, and the mounting grooves are directly mounted on the mounting frame.

* * * * *